United States Patent
Prokup et al.

(10) Patent No.: US 9,863,276 B2
(45) Date of Patent: Jan. 9, 2018

(54) ACTUATOR HOUSING FOR RAM AIR TURBINE DEPLOYMENT ACTUATOR

(71) Applicant: HAMILTON SUNDSTRAND CORPORATION, Charlotte, NC (US)

(72) Inventors: Christopher S. Prokup, Carpentersville, IL (US); David G. Bannon, Rockford, IL (US); Mark A. Osborn, Cherry Valley, IL (US); Gregory J. Bradley, Cherry Valley, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 354 days.

(21) Appl. No.: 14/625,866

(22) Filed: Feb. 19, 2015

(65) Prior Publication Data
US 2016/0245118 A1    Aug. 25, 2016

(51) Int. Cl.
*B64D 41/00*    (2006.01)
*F01D 25/24*    (2006.01)
*F03D 9/25*    (2016.01)

(52) U.S. Cl.
CPC ........... *F01D 25/24* (2013.01); *B64D 41/007* (2013.01); *F03D 9/25* (2016.05); *F05D 2220/34* (2013.01); *Y02E 10/725* (2013.01)

(58) Field of Classification Search
CPC .................. F16K 27/00; B64D 41/007; B64D 2013/0618; B64D 2013/0644; B64D 2013/0648; B64D 13/006; B64C 29/0075
See application file for complete search history.

(56) References Cited

U.S. PATENT DOCUMENTS

| | | | | |
|---|---|---|---|---|
| 5,398,780 A * | 3/1995 | Althof | .................. | B64D 41/007 185/39 |
| 5,484,120 A * | 1/1996 | Blakeley | .............. | B64D 41/007 244/54 |
| 8,920,062 B2 * | 12/2014 | Sasscer | ................ | B64D 41/007 244/58 |
| 8,970,059 B2 * | 3/2015 | Russ | ........................ | H02K 5/06 290/52 |
| 9,115,799 B2 * | 8/2015 | Russ | .................... | F16H 57/0443 |
| 2004/0227123 A1 * | 11/2004 | Rodgers | ................ | F16K 25/005 251/315.04 |
| 2015/0059875 A1 * | 3/2015 | Loveless | ................. | F16K 27/00 137/487.5 |

* cited by examiner

*Primary Examiner* — Brian M O'Hara
(74) *Attorney, Agent, or Firm* — Snell & Wilmer L.L.P.

(57) ABSTRACT

An actuator housing is provided. The actuator housing may comprise a body, and a first side of the body including a first pin interface and a first threaded hole clocked relative to the first pin interface. The first pin interface and the first threaded hole may be configured to interface with a solenoid housing. A second side of the body may be orthogonal to the first side. The second side may include a circular geometry with a cylindrical member disposed central to the circular geometry. A toggle assembly interface may be recessed in the second side and disposed within the cylindrical member.

15 Claims, 6 Drawing Sheets

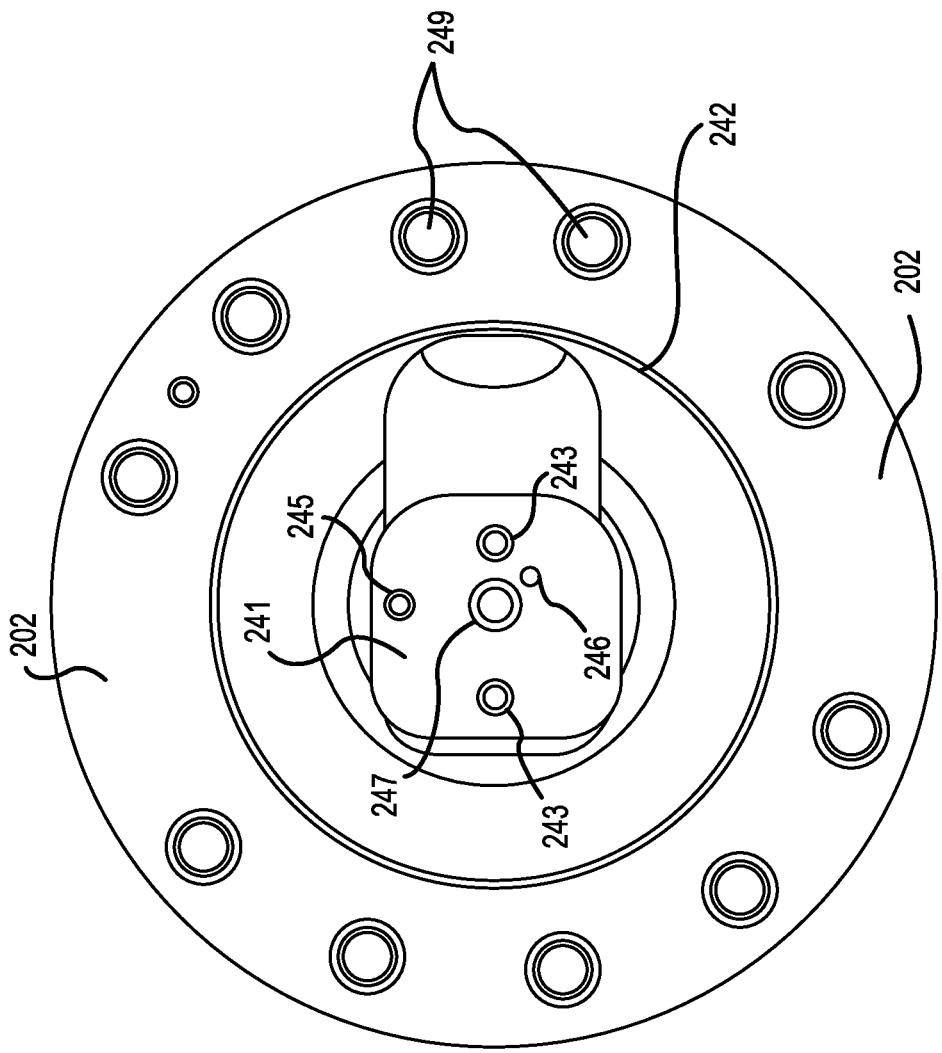

ACTUATOR HOUSING FOR RAM AIR TURBINE DEPLOYMENT ACTUATOR

FIELD OF INVENTION

The present disclosure relates to a ram air turbine (RAT), and, more specifically, to an actuator housing for a RAT.

BACKGROUND

Ram air turbines are generally used in aircraft to provide supplemental and/or emergency power to the aircraft by utilizing air flow to rotate a turbine. Ram air turbines can provide either electrical or hydraulic power. Electrical ram air turbines produce electrical power by transferring the rotational energy of the turbine to a generator. Ram air turbines can be located in a forward section of the aircraft such as the nose, for example. Ram air turbines may also be located in an aft section of the aircraft such as a tail, for example. Ram air turbines may be stowed when not in use and deployed when power is desired. In that regard, ram air turbines may include an actuator to deploy and stow the turbine. The actuators may include integrated hydraulic circuits that are designed to specific sizes. Current deployment actuators may be difficult and/or costly to make to the specified dimensions.

SUMMARY

An actuator housing may comprise a body, and a first side of the body comprising a first pin interface and a first threaded hole clocked relative to the first pin interface. The first pin interface and the first threaded hole may be configured to interface with a solenoid housing. A second side of the body may be orthogonal to the first side. The second side may comprise a circular geometry with a cylindrical member disposed central to the circular geometry. A toggle assembly interface may be recessed in the second side and disposed within the cylindrical member.

In various embodiments, the first pin interface may comprise a pin hole and a pin protruding from the pin hole. The pin may be configured to bottom in the pin hole. The pin may also comprise diamond dowel. The first threaded hole may comprise a helical insert. The toggle assembly interface may comprise a second threaded hole, an interface hole aligned with the second threaded hole, a second pin interface. The second side may comprise a plurality of third threaded holes disposed about the cylindrical member. A pin interface may be disposed on the second side radially outward from the cylindrical member.

A ram air turbine (RAT) may comprise a housing, a strut coupled to the housing, a turbine at a distal end of the strut, and a deployment actuator secured to the strut and the housing. The deployment actuator may include an actuator housing comprising a body. A first side of the body may include a first pin interface and a first threaded hole clocked relative to the first pin interface. The first pin interface and the first threaded hole may be configured to interface with a solenoid housing. A second side of the body may be orthogonal to the first side and comprise a circular geometry with a cylindrical member disposed central to the circular geometry. A toggle assembly interface may be recessed in the second side and disposed within the cylindrical member.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3D illustrates a toggle assembly in an actuator housing, in accordance with various embodiment.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
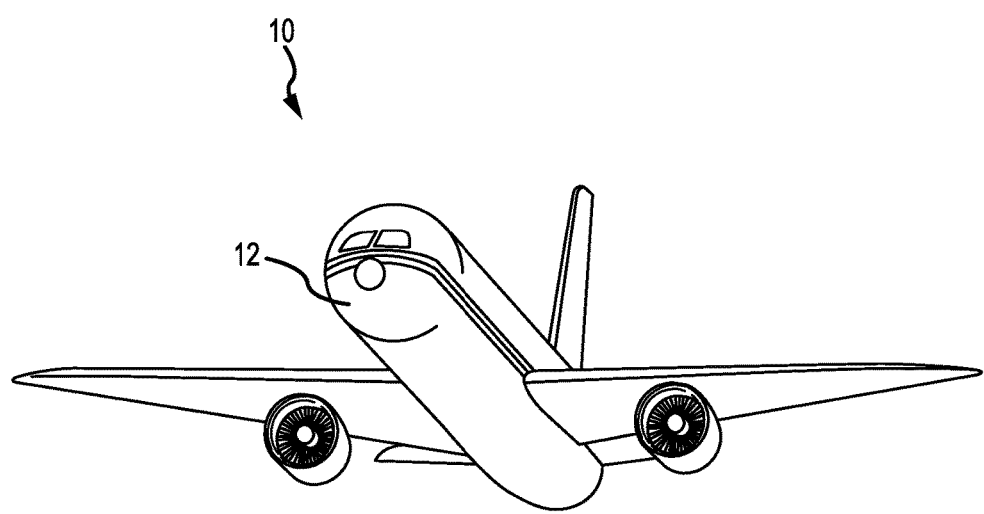
FIG. 1 illustrates a perspective view of an aircraft, in accordance with various embodiments.
Figure 2:
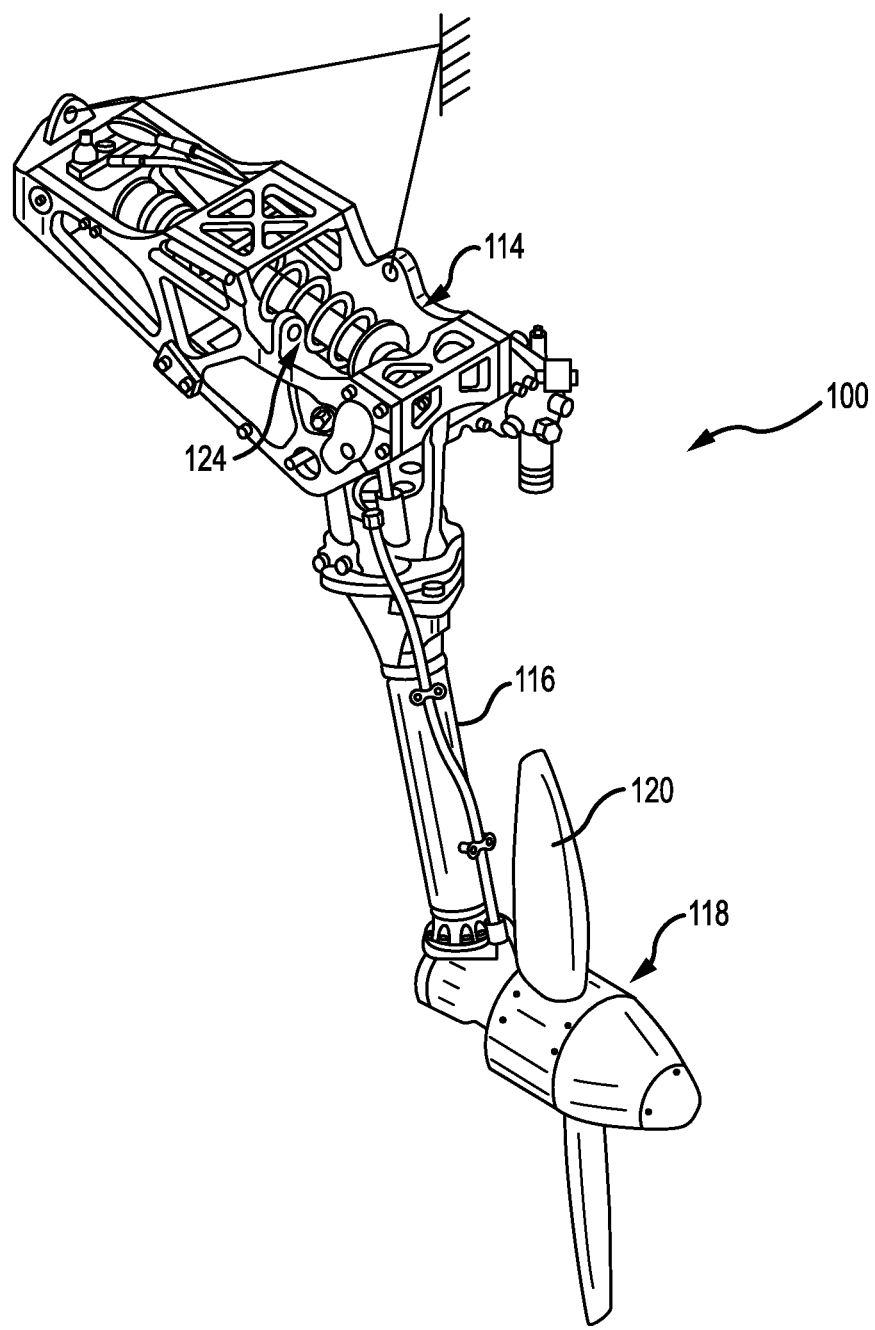
FIG. 2 illustrates a perspective view of a ram air turbine for an aircraft, in accordance with various embodiments.

In various embodiments and with reference to FIGS. 1 and 2, an aircraft 10 may comprise a ram air turbine 100. Ram air turbine 100 (RAT 100) may be lowered out aircraft 10 and into the path of airflow to generate electrical power and/or hydraulic power.

In various embodiments, RAT 100 may be secured to nose 12 of aircraft 10 by housing 114. Housing 114 may support strut 116 with turbine 118 at a distal end of strut 116. Turbine 118 may comprise blades 120 configured to rotate in response to RAT 100 being deployed. Rotation of blades 120 may drive a generator. A deployment actuator 124 may be secured to strut 116 and housing 114. Deployment actuator 124 may provide force to deploy and stow turbine 118.

Figure 3A:
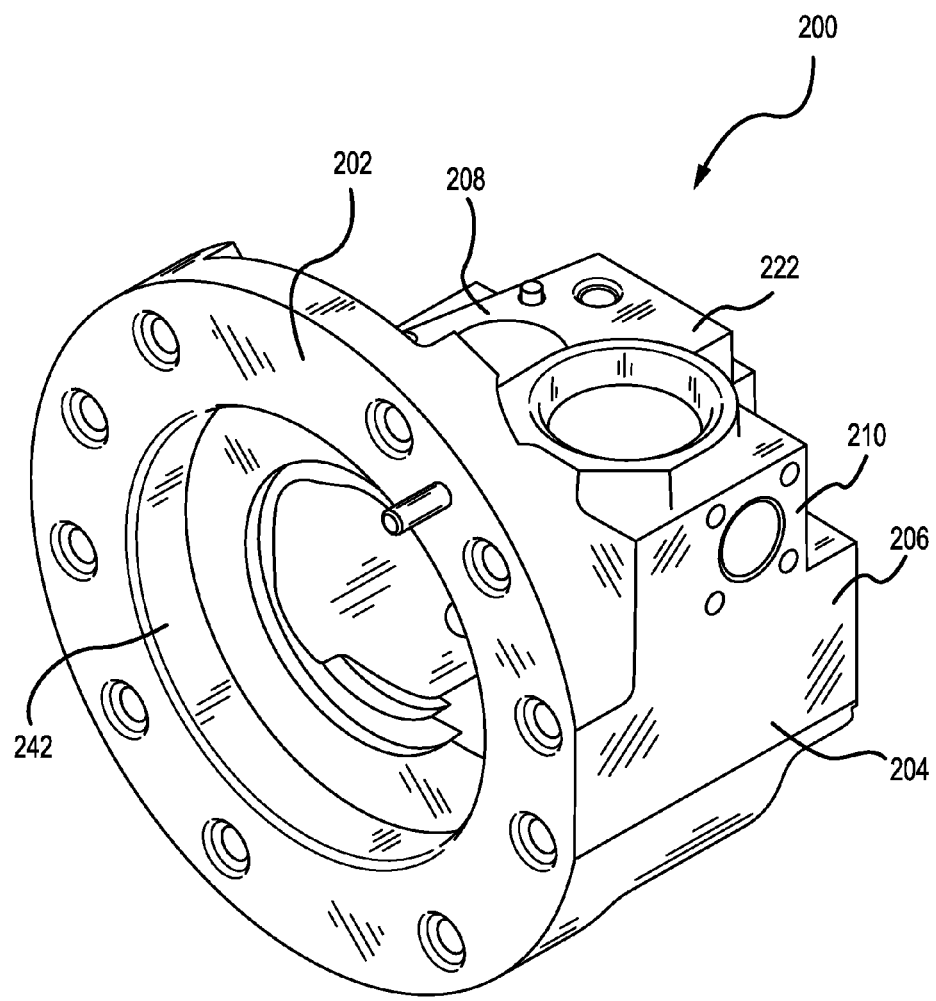
FIG. 3A illustrates a perspective view of an actuator housing, in accordance with various embodiments.

With reference to FIG. 3A, a perspective view of an actuator housing 200 is shown, in accordance with various embodiments. Actuator housing 200 may include a body 206 comprising a polygonal shape with numerous sides. For example, body 206 may comprise six sides with each side approximately orthogonal to adjacent sides. Body 206 of actuator housing 200 includes interfaces for various components related to RAT actuation.

Figure 3B:
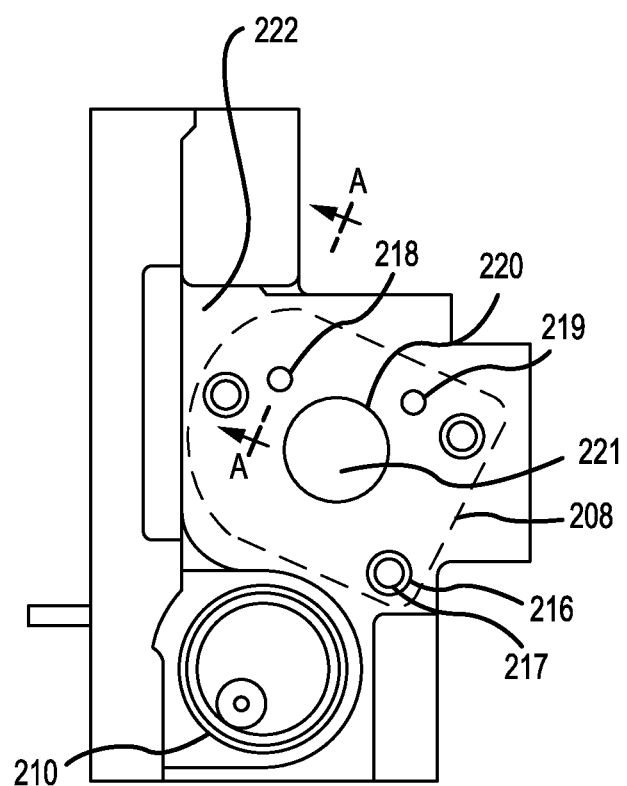
FIG. 3B illustrates an elevation view of a solenoid housing interface of an actuator housing, in accordance with various embodiments.

With reference to FIGS. 3A and 3B, a solenoid housing interface 208 in an actuator housing 200 is shown, in accordance with various embodiments. Solenoid housing interface 208 and switch interface 210 may be formed on adjacent sides of body 206. For example, solenoid housing interface 208 may be formed on side 222, and switch interface 210 may be formed on side 204. Side 204 may be adjacent to, and orthogonal to, side 222 of body 206. Solenoid housing interface 208 and switch interface 210 may include an assortment of pin interfaces, threaded holes, and/or component openings to engage components coupled to body 206 of actuator housing 200. Solenoid housing interface 208 may comprise pin interface 219 and pin interface 218. One or more of pin interface 218 and pin interface 219 may comprise a pin hole formed in surface 222 of body 206. Cylindrical member 242 may be formed in body 206

Figure 3C:
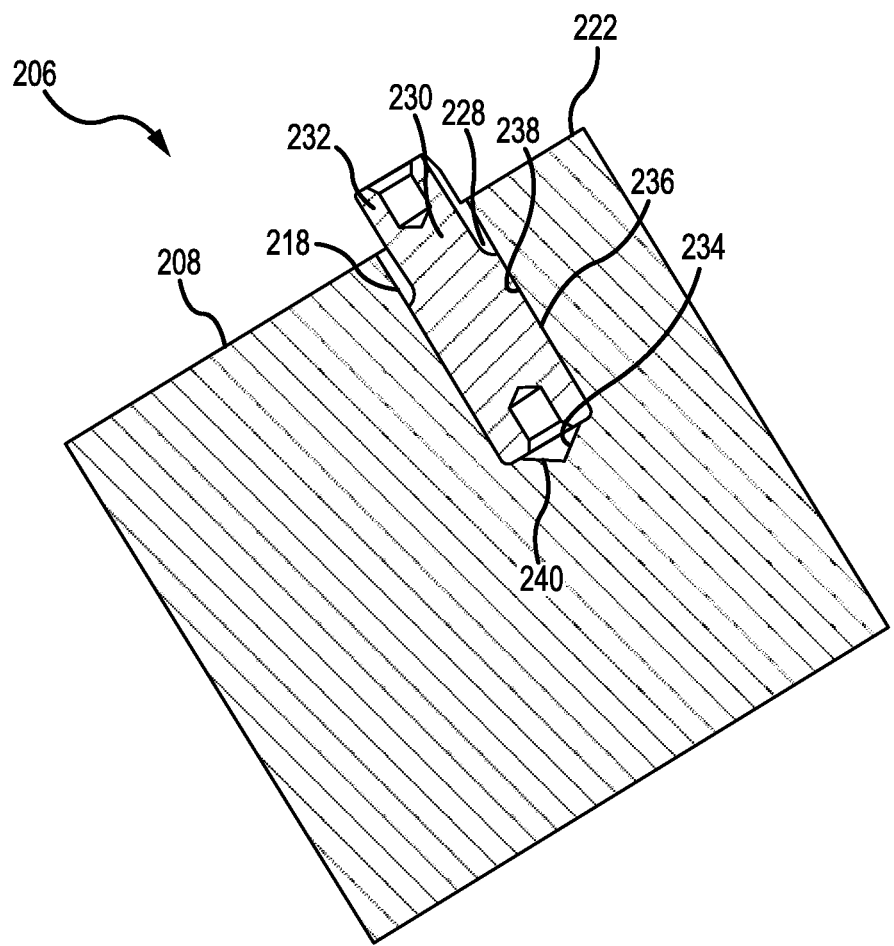
FIG. 3C illustrates a cross-sectional view of a pin hole and pin of a solenoid housing interface, in accordance with various embodiments.

With brief reference to FIG. 3C, a cross-sectional view of a pin interface 218 receiving pin 230 of a solenoid housing interface 208 is shown along line A-A of FIG. 3B, in accordance with various embodiments. Pin interface 218 includes pin hole 228 formed in surface 222 of body 206. Pin hole 228 includes a bottom surface 234, limiting the depth of pin hole 228. The depth of pin hole 228 into surface 222 may be selected based on a length of pin 230. In various embodiments, the depth may be configured so that pin hole 228 may accept pin 230 with bottom surface 240 of pin 230 bottoming (i.e., contacting) bottom surface 234 of pin hole 228. Bottom surface 234 of pin hole 228 may have a conical contour with a flat ridge surrounding the conical contour.

In various embodiments, pin body 236 may have a cylindrical contour and be configured to contact sidewalls 238 of pin hole 228 so that pin 230 is press fit into pin hole 228. Head 232 may extend out pin hole 228 when pin 230 is fully inserted into pin hole 228. Head 232 may have a geometry different than the geometry of pin body 236. Head 232 may have a diamond contour, or rectangular contour, a polygonal contour, and/or any other suitable contour. Head 232 may also have a smaller diameter circular contour than the diameter of the cylindrical geometry of pin body 236. In various embodiments, pin 230 may be diamond dowel. In that regard, pin 230 may be press fit in body 206 and have a loose fit (loose relative to the press fit of pin 230 in body 206) in the solenoid housing coupled by solenoid housing interface 208.

Returning to FIGS. 3A and 3B, pin interface 219 and pin interface 218 may have similar configurations or may vary as described above. Threaded holes 216 may be formed by making a cylindrical opening in body 206 and inserting helical coil 217 into the cylindrical opening. Threaded holes 216 may receive threaded fasteners to couple a solenoid housing to actuator housing 200. Interface hole 220 may be defined in surface 222 of body 206 and may be shaped to interface with a solenoid housing. Interface hole 220 includes solenoid housing location 221 where a coupled solenoid housing rests. The relative positions of threaded holes 216, pin interface 218, pin interface 219, and interface hole 220 are clocked (i.e., fixed relative to one another) in order to ensure accurate interface with solenoid housing interface 208 at solenoid housing location 221. In that regard, threaded holes 216, pin interface 218, pin interface 219, and interface hole 220 may have a consistent position relative to one another but may be placed in a different location relative to other parts of actuator housing 200 such as switch interface 210.

With reference to FIG. 3D, a toggle assembly interface 241 is shown in cylindrical member 242 of side 202 of actuator housing 200, in accordance with various embodiments. Side 202 may include a perimeter with a circular geometry. Cylindrical member 242 may be recessed in side 202 with cylindrical member 242 centered relative to the perimeter of side 202 with a circular geometry. Threaded holes 249 may be disposed about cylindrical member 242 in side 202 of body 206. Side 202 may be substantially orthogonal to side 204 and side 222. Toggle assembly interface 241 may be recessed in side 202 and disposed within cylindrical member 242.

In various embodiments, toggle assembly interface 241 includes threaded holes 243 disposed on opposite sides of center opening 247 and aligned with center opening 247 (i.e., with the center of threaded holes 243 aligned with the center of center opening 247). Threaded holes may be formed in body 206 as openings containing a helical coil insert. Spring interface 246 is configured to receive a spring tang of a toggle assembly. Pin interface 245 may receive a pin protruding from a toggle assembly to be coupled to body 206 by toggle assembly interface 241. Pin interface 245 may be similar to pin interface 218 (of FIG. 3C). Pin interface 245, threaded holes 243, center opening 247, and spring interface 246 may all be clocked (i.e., fixed relative to one another) in order to ensure accurate interface with a toggle assembly coupled to toggle assembly interface 241.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ram air turbine (RAT) having an actuator to deploy and stow the RAT, the actuator having an actuator housing, comprising:
    a body;
    a first side of the body comprising a first pin interface and a first threaded hole clocked relative to the first pin interface, wherein the first pin interface and the first threaded hole are configured to interface with a solenoid housing;
    a second side of the body orthogonal to the first side and comprising a perimeter having a circular geometry and a cylindrical member recessed in the second side and central relative to the perimeter, wherein a plurality of threaded holes are disposed in the second side and about the cylindrical member; and
    a toggle assembly interface disposed within and extending from a bottom of the cylindrical member, wherein the toggle assembly interface comprises a second threaded hole and is configured to receive a toggle assembly.

2. The actuator housing of claim 1, wherein the first pin interface comprises:
    a pin hole; and
    a pin protruding from the pin hole.

3. The actuator housing of claim 2, wherein the pin is configured to bottom in the pin hole.

4. The actuator housing of claim 3, wherein the pin comprises diamond dowel.

5. The actuator housing of claim 1, wherein the first threaded hole comprises a helical insert.

6. The actuator housing of claim 1, wherein the toggle assembly interface further comprises:
    an interface hole aligned with the second threaded hole; and
    a second pin interface.

7. The actuator housing of claim 1, wherein the second side comprises a plurality of third threaded holes disposed about the cylindrical member.

8. The actuator housing of claim 1, further comprising a pin interface disposed on the second side radially outward from the cylindrical member.

9. A ram air turbine (RAT), comprising:
    a housing;
    a strut coupled to the housing;
    a turbine at a distal end of the strut; and
    a deployment actuator secured to the strut and the housing, the deployment actuator comprising:
        an actuator housing comprising a body,
        a first side of the body comprising a first pin interface and a first threaded hole clocked relative to the first pin interface, wherein the first pin interface and the first threaded hole are configured to interface with a solenoid housing,
        a second side of the body orthogonal to the first side and comprising a perimeter having a circular geometry and a cylindrical member recessed in the second side and central relative to the perimeter, wherein a plurality of threaded holes are disposed in the second side and about the cylindrical member; and
        a toggle assembly interface disposed within and extending from a bottom of the cylindrical member, wherein the toggle assembly interface comprises a second threaded hole and is configured to receive a toggle assembly.

10. The RAT of claim 9, wherein the first pin interface comprises:
    a pin hole; and
    a pin protruding from the pin hole.

11. The RAT of claim 10, wherein the pin is configured to bottom in the pin hole.

12. The RAT of claim 10, wherein the pin comprises a pin head having a polygonal geometry.

13. The RAT of claim 9, wherein the first threaded hole comprises a helical insert.

14. The RAT of claim 9, wherein the toggle assembly interface further comprises:
    an interface hole aligned with the second threaded hole; and
    a second pin interface.

15. The RAT of claim 9, further comprising a pin interface disposed on the second side of the body and radially outward from the cylindrical member.

* * * * *